Aug. 3, 1937.  E. S. TAYLOR  2,088,729
MAGNETIC REACTION MOTOR
Filed July 17, 1936
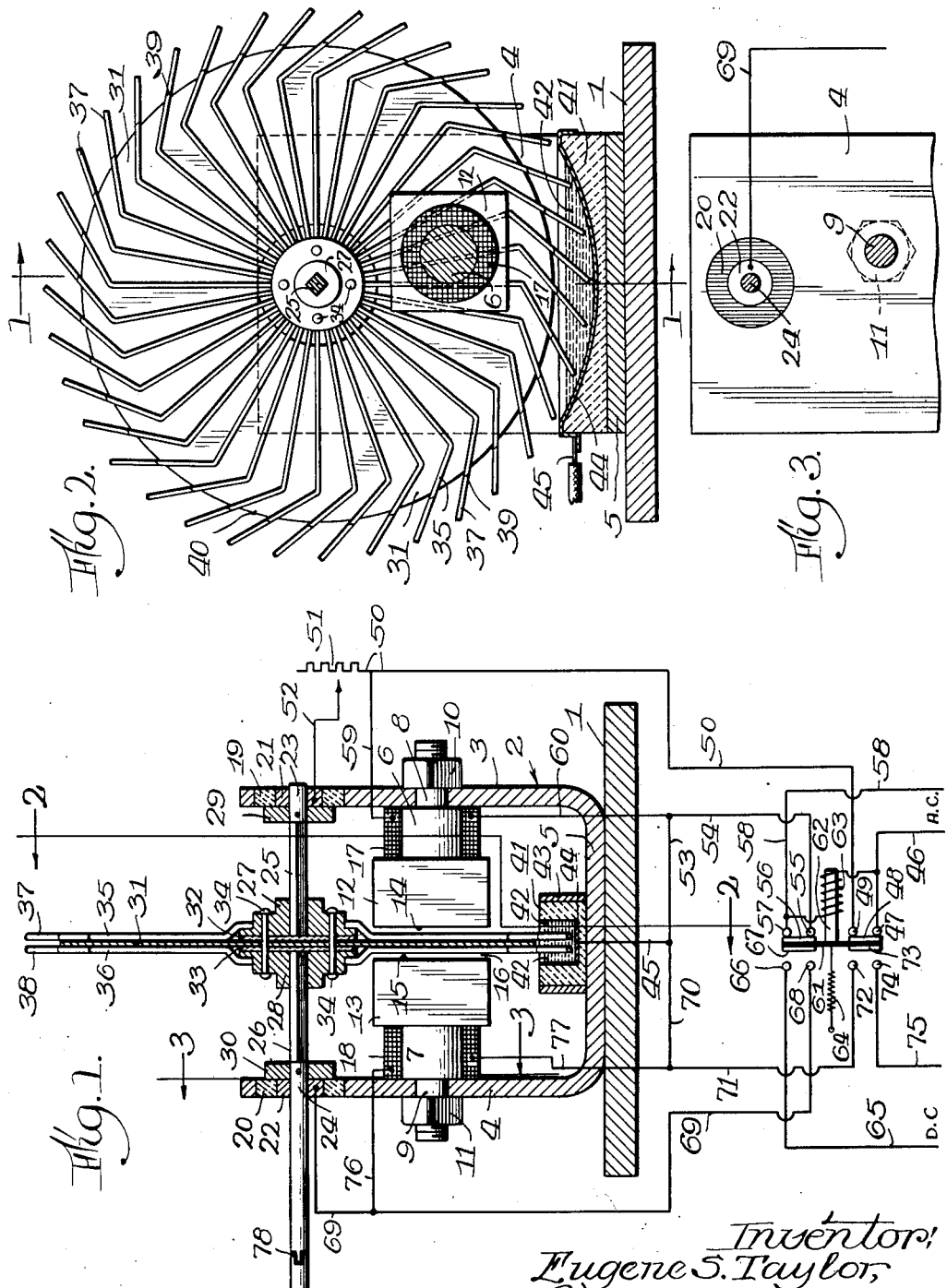
Inventor:
Eugene S. Taylor,
By: Parkinson & Lane, Atty.

Patented Aug. 3, 1937

2,088,729

UNITED STATES PATENT OFFICE 2,088,729

MAGNETIC REACTION MOTOR

Eugene S. Taylor, Chicago, Ill.

Application July 17, 1936, Serial No. 91,142

15 Claims. (Cl. 171—212)

The present invention relates to electrical motors and more particularly to simple motors of the magnetic reaction type which gives comparatively more torque at low speed than other types of motors of the same size and current consumption.

Among the objects of the invention is to provide a novel motor comprising relatively movable magnetic members coacting by magnetic stresses in such members with one of them having a field of given magnetic flux density and another comprising a series of electrical conductors which may be energized serially either singly but preferably with a given number in offset relation to the medial locus of the field mentioned so as to produce a relative movement of the members toward a coincidence of the medial locus of the energized conductors and the medial locus of the field, and means to close a circuit to the given number of conductors serially as the members are relatively moved. The field member preferably has its poles opposite each other with as small a gap between them as will permit the movement of the conductor carrying member and still have as little magnetic flux reluctance as possible. The poles are of any desired or given polarities, either of the same or of opposite polarities, and the field is of a given magnetic flux density. If desired the field member may be a permanent magnet but preferably it is an electromagnet having one or more energizing coils having one or more energizing circuits but the latter are separate and independent from the circuit of the conductors of the conductor carrying member. The circuit closing means comprises a suitable contact wiping or like element for the successive circuit closing contact of the free ends of the conductors mentioned above, the element being of any suitable electrically conducting material, such as mercury, an arc shaped metal segment, or the like, so constructed and arranged as to close circuit with such of the conductors as have their medial locus offset from the medial locus of the field in which the conductors react to cause a relative movement of the members. When mercury is used it is preferably held in a trough equipped with a metal conductor in contact with the mercury and connected in the circuit of the conductors. The conductors at their other ends are connected to a common conductor in the circuit last mentioned.

In a specific illustrative embodiment the field member acts as a stator and the other member acts as an armature. The stator may be of U-shape and have spaced poles of given polarities and with the pole faces in parallel planes at right angles to the plane of the U-shaped member in general, as also at a normal to the magnetic flux lines. The armature will act under the influence of the electrical effect in the conductors with a torque or thrust stress proportional to the electrical effect in the conductors. The armature comprises a supporting member for the conductors and such supporting member may be of magnetic or non-magnetic material as desired, but for the purpose of efficiency it is preferable that it be of magnetizable material and be of such a thickness as to nearly fill the gap between the poles so as to reduce the magnetic field flux reluctance to a minimum. The conductors are preferably fixed to the support and suitably insulated therefrom, and in the case where the support is of magnetizable material it is preferable to set the conductors in channels provided in the surfaces of the conductor supporting member whereby the surfaces of this supporting member are as close to the pole surfaces of the stator as possible.

Another object of the invention is to provide a novel motor of the type mentioned which will be operable on either alternating or direct current, it being designed to normally operate on one current, such as A. C., and upon failure of such current, then to immediately operate on the other current, such as D. C., until the former current is reestablished at which instant the device will immediately operate on the first mentioned current. A suitable switch is connected to the circuits of the different currents mentioned and operates automatically to change the circuits from one current to the other upon the failure of one current. The motor of this invention is, therefore, in the nature of a universal or duplex motor capable of operation on either kind of current.

Other objects, advantages, capabilities, features, and the like are comprehended by the invention as will later appear and as are inherently possessed by the invention.

Referring to the drawing:

Fig. 1 is a vertical sectional view of an illustrative embodiment of the invention taken in a plane represented by line 1—1 of Fig. 2 of the drawing;

Fig. 2 is a side view in elevation with parts in section of the same;

Fig. 3 is a fragmentary side view of the same.

Referring more in detail to the drawing the embodiment selected to illustrate the invention is shown as comprising a support or base 1 upon which is carried a U-shaped magnet or magnetizable member 2 having legs 3 and 4 and a crosspiece 5. To the legs 3 and 4 are secured cores 6 and 7 by way of bolts 8 and 9 and nuts 10 and 11, the cores having polar shoes 12 and 13 with their pole faces 14 and 15 in spaced parallel relation to provide between them a gap 16 for the magnetic field flux. On the cores 6 and 7 are provided suitable energizing coils 17 and 18 so wound as to give the poles 12 and 13 given polarities.

At the upper ends of the legs 3 and 4 are secured electrically insulated elements 19 and 20 in which are carried electrically conducting bearing elements 21 and 22 in which are rotatively supported the journals 23 and 24 and shafts 25 and 26, the latter being polygonal in cross section (as square) and fixed to the hub parts 27 and 28. To the shafts 25 and 26 are secured thrust collars 29 and 30 by any suitable securing elements, such as crosspins or the like.

Clamped between the hub parts 27 and 28 is a disc 31 as also insulating discs 32 and 33, the clamping being effected by suitable fastening elements such as bolts 34 also suitably insulated from the hub parts 27 and 28. To the hub parts 27 and 28 are secured the inner ends of a circular series of radially extending conductors 35 and 36 disposed on each face of the disc 31, these conductors being preferably fixed in any suitable manner to the disc 31. The outer ends of these conductors are suitably bent or curved to provide secantly disposed conductor segments 37 and 38. These conductors are preferably insulated from where they leave the hub parts 27 and 28 to points 39 beyond the periphery or rim 40 of the disc 31, the remaining parts of these conductors being bare for a purpose later described. The disc 31 may be of non-magnetic material, whether metal or nonmetallic, or may be of magnetizable material. Preferably, it is of the latter and is preferably sufficiently thick as to nearly fill the gap 16 between the pole faces 14 and 15, in which case the opposite faces of the disc 31 will be provided with channels for containing the conductors 35 and 36, the outer surfaces of the disc 31 and the outer surfaces of the conductors 35 and 36 being substantially in the same planes. In practice the pole faces 14 and 15 of the polar members 12 and 13 are as close to the surfaces of the disc as is practicable (the spaces shown in the drawing being exaggerated for clarity) in order to reduce the magnetic field flux reluctance to a minimum.

Upon the member 5 is supported a trough member 41 of insulating material, in which is provided an arc shaped channel or chamber in which is included mercury 42. The member 41 may be removably held in place by the walls 43 fixed to the base 5. The bottom of the mercury channel or chamber is preferably provided with an arc shaped metallic lining 44 suitably electrically connected to a lead 45.

The motor of this invention is of the universal or duplex type and is designed to operate on either A. C. or D. C. electricity. Accordingly the circuits are so connected through a suitable switch as to operate on a given current and if that current should at any time fail then the switch automatically operates to close the circuit of the other current to the device for its continued and uninterrupted operation and service.

The A. C. circuit comprises the main line wire 46 running to contact 47, switch blade 48, contact 49, wire 50, rheostat 51, wire 52, bearing 21, shaft 23—25, hub part 27, those conductors 35 which have their free bare ends 37 dipping in the mercury 42 or wiping contact with the metal lining 44, mercury 42, and/or metal lining 44, wire 45, wire 53, wire 54, switch contact 55, switch blade 56, contact 57, to main line wire 58. A separate and independent circuit is used to energize the coil 17 and may be in the form of a shunt circuit comprising wire 59 running from wire 50 through the coil and wire 60 running to wire 54. The switch has a bar 61 of insulating material to which is fixed an induction core 62 having an induction coil 63 connected across the line 46—58, so that while the current is on, the coil 63 reacts on the core 62 to maintain the switch closed with the contacts 47, 49, 55 and 57. Should the current (A. C.) fail, then a spring 64 immediately opens the switch from these contacts and closes with the contacts of the D. C. circuit to close this circuit to the other side of the motor and to effect its continued operation and service without any interruption.

The D. C. circuit is by way of the main line wire 65, contact 66, switch blade 67, contact 68, wire 69, bearing 22, shaft 24—26, hub part 28, those conductors 36 which have their free bare end portions 38 dipping in the mercury 42 or wiping contact with the metal lining 44, mercury 42, and/or metal lining 44, wire 45, wire 70, wire 71, contact 72, switch blade 73, contact 74, to main line wire 75. In this case also the coil 18 is energized by a separate and independent circuit which may be in the form of a shunt circuit comprising wire 76 connected to the wire 69, coil 18, and wire 77 connected to the wire 71. When the alternating current is reestablished the induction coil 63 is energized and the switch opens the D. C. circuit by moving from the contacts 66, 68, 72 and 74 and closes the A. C. circuit by contacting the contacts 57, 55, 49 and 47, as shown in Fig. 1, to maintain the continued operation and service of the motor without interruption.

When the A. C. circuit is closed, only coils 17 and 63 are energized, and when the D. C. circuit is closed only coil 18 is energized.

In operation, whichever circuit may be closed, the current flow is through only those conductors 35 and 36 which dip into the mercury 42 or wipe contact with the lining 44. It will be noticed that the poles 12 and 13 are offset, see Fig. 2, from the vertical radius of the armature so that the medial locus of the aggregate of the dipping conductors is to one side of the medial locus of the magnetic field flux in which such conductors are reacting. The result is an electromagnetic stress to cause the dipping conductors to move transversely of the magnetic field flux toward a coincidence of the loci mentioned, but before such coincidence occurs or may be established the leading dipping conductors will rise out of the mercury or leave contact with the lining, thus opening the circuit in that particular conductor, and the conductor next to the trailing dipping conductor will dip into the mercury or make contact with the lining to close a circuit to the newly dipped conductor. This action or function continues successively serially of the circular series of the conductors, thus producing a continued smooth regular movement of the armature with a greater torque than that produced by an ordinary type motor of the same size and current consumption.

The shaft is connected to the means to be operated by this motor in any suitable manner. In order to prevent short-circuiting, the shaft may be provided with an insulating clutch piece 78 as shown in Fig. 1. Any other suitable means of insulating, of course, may be used.

The motor of this invention is useful to operate any device desired but is especially useful in operating such means as require a substantial torque at low speed which cannot be obtained from the usual type of motor without the use of reducing gearing or like device. As for example, a few of the uses to which the present invention is particularly adapted are, to operate electrical signs, signals, flashers, meters, etc.

While I have herein disclosed and upon the drawing shown an illustrative embodiment of the invention, it is to be understood that the invention is not limited thereto but comprehends other constructions, details, arrangements of parts, features and the like without departing from the spirit of the invention.

Having thus disclosed the invention, I claim:

1. A motor comprising relatively movable magnetic members coacting by magnetic stresses in said members, one of said members having a field of given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, and means for closing a circuit to said given number of conductors serially as said members are relatively moved.

2. A motor comprising relatively movable magnetic members coacting by magnetic stresses in said members, one of said members having spaced poles with a field between said poles of a given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, means for energizing said poles with given polarities, said energizing means having an energizing circuit separate and independent from said circuit of said conductors, and means for closing a circuit to said given number of conductors serially as said members are relatively moved.

3. A motor comprising relatively movable magnetic members coacting by magnetic stresses in said members, one of said members having spaced poles with a field between said poles of a given magnetic flux density, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, and means for closing a circuit to said given number of conductors serially as said movable member moves through said field.

4. A motor comprising relatively movable magnetic members coacting by magnetic stresses in said members, one of said members having a field of given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, and means for closing a circuit to said given number of conductors serially as said members are relatively moved, said circuit closing means comprising an arc shaped conducting element so constructed and arranged as to be successively contacted by said conductors for serial circuit closing of the circuit through said conductors as said members are relatively moved.

5. A motor comprising relatively movable magnetic members coacting by magnetic stresses in said members, one of said members having spaced poles with a field between said poles of a given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, means for energizing said poles with given polarities, said energizing means having an energizing circuit separate and independent from said circuit of said conductors, and means for closing a circuit to said given number of conductors serially as said members are relatively moved, said circuit closing means comprising an arc shaped conducting element so constructed and arranged as to be successively contacted by said conductors for serial circuit closing of the circuit through said condutors as said members are relatively moved.

6. A motor comprising relatively movable magnetic members coacting by magnetic stresses in said members, one of said members having a field of given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, and means for closing a circuit to said given number of conductors serially as said members are relatively moved, said circuit closing means comprising a trough of mercury so constructed and arranged as to successively close circuit with said conductors as the conductors successively dip in the mercury as said members are relatively moved.

7. A motor comprising relatively movable magnetic members coacting by magnetic stresses in said members, one of said members having spaced poles with a field between said poles of a given magnetic flux density, another of said members having a series of electrical conductors so constructed and arranged as to be energized serially in given number in offset relation to the medial locus of said field for relatively moving said members toward coincidence of the medial locus of said energized conductors and the medial locus of said field, means for energizing said poles with given polarities, said energizing means having an energizing circuit separate and independent from said circuit of said conductors, and means for closing a circuit to said given number of conductors serially as said members are relatively moved, said circuit closing means comprising a trough of mercury so constructed and arranged as to successively close circuit with said conductors as the conductors successively dip in the mercury as said members are relatively moved.

8. A motor comprising relatively movable magnetic members coacting by magnetic stresses in said members, one of said members having spaced poles with a field between said poles of a given magnetic flux density, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, and means for closing a circuit to said given number of conductors serially as said movable member moves through said field, said circuit closing means comprising an arc shaped conducting element so constructed and arranged as to be successively contacted by said conductors for serial circuit closing of the circuit through said conductors as said members are relatively moved.

9. A motor comprising relatively movable magnetic members coacting by magnetic stresses in said members, one of said members having spaced poles with a field between said poles of a given magnetic flux density, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, and means for closing a circuit to said given number of conductors serially as said movable member moves through said field, said circuit closing means comprising a trough of mercury so constructed and arranged as to successively close circuit with said conductors as the conductors successively dip in the mercury as said members are relatively moved.

10. A motor comprising relatively movable magnetic members coacting by magnetic stresses in said members, one of said members having spaced poles with a field between said poles of a given magnetic flux density, means for energizing said poles with given polarities, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, and means for closing a circuit to said given number of conductors serially as said movable member moves through said field, said circuit closing means comprising an arc shaped conducting element so constructed and arranged as to be successively contacted by said conductors for serial circuit closing of the circuit through said conductors as said members are relatively moved.

11. A motor comprising relatively movable magnetic members coacting by magnetic stresses in said members, one of said members having spaced poles with a field between said poles of a given magnetic flux density, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, means for energizing said poles with given polarities, said energizing means having an energizing circuit separate and independent from said circuit of said conductors, and means for closing a circuit to said given number of conductors serially as said movable member moves through said field, said circuit closing means comprising an arc shaped conducting element so constructed and arranged as to be successively contacted by said conductors for serial circuit closing of the circuit through said conductors as said members are relatively moved.

12. A motor comprising relatively movable magnetic members coacting by magnetic stresses in said members, one of said members having spaced poles with a field between said poles of a given magnetic flux density, another of said members being so constructed and arranged as to move between said poles and through said field, said latter member having a series of electrical conductors so constructed and arranged as to be energized serially in given number in offset relation to the medial locus of said field for moving said latter member toward coincidence of the medial locus of said energized conductors and the medial locus of said field, means for energizing said poles with given polarities, said energizing means having an energizing circuit separate and independent from said circuit of said conductors, and means for closing a circuit to said given number of conductors serially as said movable member moves through said field, said circuit closing means comprising a trough of mercury so constructed and arranged as to successively close circuit with said conductors as the conductors successively dip in the mercury as said members are relatively moved.

13. A motor comprising a stator and a translator coacting by magnetic stresses therein to effect a relative movement thereof, said stator comprising a magnetic member having spaced poles of given polarities to provide a gap therebetween for a field flux of given magnetic density, said translator comprising a member of magnetizable material and so constructed and arranged as to move in said gap and across said field and to provide an element of low magnetic reluctance for the passage of the magnetic flux between the poles of said stator, said translator carrying a series of electrically conducting elements so arranged and constructed as to move successively across said field as said translator moves relative to said stator, said conducting elements being connected at an end thereof to a circuit and the other ends thereof being free, a circuit closing means connected to said circuit and so constructed and arranged as to be contacted successively by the free ends of said conducting elements for closing circuit therewith serially as said translator is moved relative to said stator and for energizing such of said conducting elements as have their medial locus offset from the medial locus of said field to move the translator with the medial locus of the energized conductors toward the medial locus of said field.

14. A motor comprising a stator and a translator coacting by magnetic stresses therein to effect a relative movement thereof, said stator comprising an electromagnetic member having spaced poles of given polarities to provide a gap therebetween for a field flux of given magnetic density, means for energizing said poles with given polarities, a circuit for said energizing means, said translator comprising a member of magnetizable material and so constructed and arranged as to move in said gap and across said field and to provide an element of low magnetic reluctance for the passage of the magnetic flux between the poles of said stator, said translator carrying a series of electrically conducting elements so arranged and constructed as to move successively across said field as said translator moves relative to said stator, said conducting elements being connected at an end thereof to a circuit and the other ends thereof being free, said circuit to said conducting elements being separate and independent from said energizing circuit for said stator energizing means, and a circuit closing means connected to said circuit and so constructed and arranged as to be contacted successively by the free ends of said conducting elements for closing circuit therewith serially as said translator is moved relative to said stator and for energizing such of said conducting elements as have their medial locus offset from the medial locus of said field to move the translator with the medial locus of the energized conductors toward the medial locus of said field.

15. A motor comprising a stator and a translator coacting by magnetic stresses therein to effect a relative movement thereof, said stator comprising an electromagnetic member having spaced poles of given polarities to provide a gap therebetween for a field flux of given magnetic density, means for energizing said poles with given polarities, a circuit for said energizing means, said translator comprising a member of magnetizable material and so constructed and arranged as to move in said gap and across said field and to provide an element of low magnetic reluctance for the passage of the magnetic flux between the poles of said stator, said translator carrying a series of electrically conducting elements so arranged and constructed as to move successively across said field as said translator moves relative to said stator, said conducting elements being connected at an end thereof to a circuit and the other ends thereof being free, said circuit to said conducting elements being separate and independent from said energizing circuit for said stator energizing means, a circuit closing means for closing said circuit to said conducting elements and comprising a trough of mercury so constructed and arranged as to successively close said circuit with said conducting elements by the free ends thereof successively dipping in said mercury as the translator is moved for energizing such of said conducting elements as have their medial locus offset from the medial locus of said field to move the translator with the medial locus of the energized conductors toward the medial locus of said field.

EUGENE S. TAYLOR.